(12) United States Patent
Shaburova (10) Patent No.: US 9,928,874 B2
(45) Date of Patent: *Mar. 27, 2018

(54) METHOD FOR REAL-TIME VIDEO PROCESSING INVOLVING CHANGING FEATURES OF AN OBJECT IN THE VIDEO

(71) Applicant: Snap Inc., Venice, CA (US)

(72) Inventor: Elena Shaburova, Castro Valley, CA (US)

(73) Assignee: SNAP INC., Venice, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/314,324

(22) Filed: Jun. 25, 2014

(65) Prior Publication Data
US 2015/0222821 A1    Aug. 6, 2015

Related U.S. Application Data (60) Provisional application No. 61/936,016, filed on Feb. 5, 2014.

(51) Int. Cl.
*G06K 9/36* (2006.01)
*G06K 9/00* (2006.01)
(Continued)

(52) U.S. Cl.
CPC ............ *G11B 27/031* (2013.01); *G06F 3/011* (2013.01); *G06K 9/00261* (2013.01);
(Continued)

(58) Field of Classification Search
None
See application file for complete search history.

(56) References Cited

U.S. PATENT DOCUMENTS

| 4,888,713 A * | 12/1989 | Falk | ................... G06T 15/04 345/419 |
| 5,479,603 A * | 12/1995 | Stone | ..................... G06T 11/00 715/804 |

(Continued)

FOREIGN PATENT DOCUMENTS

CA    2887596 A1    7/2015

OTHER PUBLICATIONS

Dornaika, F., Davoine, F.: On appearance based face and facial action tracking. IEEE Trans. Circuits Syst. Video Technol. 16(9), Sep. 2006: p. 1107-1124).

(Continued)

*Primary Examiner* — Feng Niu
(74) *Attorney, Agent, or Firm* — Schwegman Lundberg & Woessner, P.A.

(57) ABSTRACT

A method for real-time video processing for changing features of an object in a video is presented. The method comprises providing an object in the video, where the object is at least partially and at least occasionally presented in frames of the video. The method detects the object in the video and generates a list of at least one element of the object. The list is based on the object's features to be changed according to a request for modification. The at least one element of the object is detected and tracked. The method transforms the frames of the video such that the at least one element of the object is modified according to the request for modification.

23 Claims, 6 Drawing Sheets

(51) Int. Cl.

| | | |
|---|---|---|
| *G11B 27/031* | (2006.01) | |
| *G06T 5/00* | (2006.01) | |
| *G06T 11/00* | (2006.01) | |
| *G06T 13/40* | (2011.01) | |
| *G06T 17/20* | (2006.01) | |
| *G06T 19/20* | (2011.01) | |
| *G06F 3/01* | (2006.01) | |
| *G06N 99/00* | (2010.01) | |
| *H04N 5/262* | (2006.01) | |
| *G06K 9/46* | (2006.01) | |
| *G06K 9/52* | (2006.01) | |
| *G06T 11/60* | (2006.01) | |
| *H04N 9/79* | (2006.01) | |
| *G06T 7/33* | (2017.01) | |
| *G06T 7/246* | (2017.01) | |
| *G06T 7/90* | (2017.01) | |

(52) U.S. Cl.
CPC ..... *G06K 9/00268* (2013.01); *G06K 9/00281* (2013.01); *G06K 9/00302* (2013.01); *G06K 9/00335* (2013.01); *G06K 9/00711* (2013.01); *G06K 9/00744* (2013.01); *G06K 9/46* (2013.01); *G06K 9/4652* (2013.01); *G06K 9/4661* (2013.01); *G06K 9/52* (2013.01); *G06N 99/005* (2013.01); *G06T 5/005* (2013.01); *G06T 7/246* (2017.01); *G06T 7/251* (2017.01); *G06T 7/33* (2017.01); *G06T 7/90* (2017.01); *G06T 11/001* (2013.01); *G06T 11/60* (2013.01); *G06T 13/40* (2013.01); *G06T 17/20* (2013.01); *G06T 19/20* (2013.01); *H04N 5/262* (2013.01); *H04N 9/79* (2013.01); *G06K 2009/4666* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01)

(56) References Cited

U.S. PATENT DOCUMENTS

| | | | |
|---|---|---|---|
| 6,038,295 A | 3/2000 | Mattes | |
| 6,621,939 B1 | 9/2003 | Negishi et al. | |
| 6,768,486 B1* | 7/2004 | Szabo | G06T 17/20 345/420 |
| 6,980,909 B2 | 12/2005 | Root et al. | |
| 7,034,820 B2* | 4/2006 | Urisaka | G06T 17/00 345/419 |
| 7,119,817 B1 | 10/2006 | Kawakami | |
| 7,167,519 B2* | 1/2007 | Comaniciu | H04N 19/23 375/240.08 |
| 7,173,651 B1 | 2/2007 | Knowles | |
| 7,227,567 B1* | 6/2007 | Beck | H04N 7/147 348/14.01 |
| 7,239,312 B2* | 7/2007 | Urisaka | G06T 17/00 345/419 |
| 7,411,493 B2 | 8/2008 | Smith | |
| 7,535,890 B2 | 5/2009 | Rojas | |
| 7,564,476 B1* | 7/2009 | Coughlan | H04N 7/147 348/14.01 |
| 7,697,787 B2* | 4/2010 | Illsley | H04N 5/272 382/118 |
| 7,945,653 B2 | 5/2011 | Zuckerberg et al. | |
| 8,131,597 B2 | 3/2012 | Hudetz | |
| 8,199,747 B2 | 6/2012 | Rojas et al. | |
| 8,230,355 B1 | 7/2012 | Bauermeister et al. | |
| 8,295,557 B2* | 10/2012 | Wang | G06K 9/00234 382/118 |
| 8,296,456 B2* | 10/2012 | Klappert | H04N 9/75 348/143 |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,761,497 B2* | 6/2014 | Berkovich | G06T 5/50 382/155 |
| 8,766,983 B2* | 7/2014 | Marks | A63F 13/06 345/419 |
| 8,874,677 B2 | 10/2014 | Rosen et al. | |
| 8,909,679 B2 | 12/2014 | Roote et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,232,189 B2 | 1/2016 | Shaburov et al. | |
| 9,396,525 B2 | 7/2016 | Shaburova et al. | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 2003/0228135 A1* | 12/2003 | Illsley | H04N 5/272 386/285 |
| 2004/0119662 A1 | 6/2004 | Dempski | |
| 2004/0233223 A1* | 11/2004 | Schkolne | G06F 3/0346 345/621 |
| 2005/0128211 A1* | 6/2005 | Berger | G06T 19/00 345/582 |
| 2005/0180612 A1 | 8/2005 | Nagahashi et al. | |
| 2005/0202440 A1* | 9/2005 | Fletterick | G01N 33/743 435/6.16 |
| 2006/0170937 A1 | 8/2006 | Takahashi | |
| 2006/0227997 A1 | 10/2006 | Au et al. | |
| 2007/0013709 A1* | 1/2007 | Charles | G06F 17/50 345/581 |
| 2007/0268312 A1 | 11/2007 | Marks et al. | |
| 2008/0184153 A1* | 7/2008 | Matsumura | G06F 17/5009 715/772 |
| 2009/0158170 A1* | 6/2009 | Narayanan | H04L 67/306 715/753 |
| 2011/0018875 A1* | 1/2011 | Arahari | G06T 15/04 345/420 |
| 2011/0202598 A1 | 8/2011 | Evans et al. | |
| 2012/0144325 A1 | 6/2012 | Mital et al. | |
| 2012/0167146 A1 | 6/2012 | Incorvia | |
| 2012/0209924 A1 | 8/2012 | Evans et al. | |
| 2012/0306853 A1 | 12/2012 | Wright et al. | |
| 2013/0190577 A1 | 7/2013 | Brunner et al. | |
| 2013/0201187 A1 | 8/2013 | Tong et al. | |
| 2013/0208129 A1 | 8/2013 | Stenman | |
| 2014/0043329 A1* | 2/2014 | Wang | G06T 17/20 345/420 |
| 2015/0097834 A1* | 4/2015 | Ma | G06T 17/05 345/426 |
| 2015/0131924 A1 | 5/2015 | He et al. | |
| 2015/0195491 A1* | 7/2015 | Shaburov | H04N 7/15 348/14.12 |
| 2015/0213604 A1* | 7/2015 | Li | G06T 13/40 345/473 |
| 2015/0221069 A1* | 8/2015 | Shaburova | G06T 5/005 382/167 |
| 2015/0221118 A1* | 8/2015 | Shaburova | G06T 5/005 345/423 |
| 2015/0221136 A1* | 8/2015 | Shaburova | G06T 5/005 345/419 |
| 2015/0221338 A1 | 8/2015 | Shaburova et al. | |
| 2016/0322079 A1 | 11/2016 | Shaburova et al. | |

OTHER PUBLICATIONS

"U.S. Appl. No. 14/314,312, Non Final Office Action dated Nov. 5, 2015", 26 pgs.

"U.S. Appl. No. 14/314,312, Response filed Apr. 5, 2016 to Non Final Office Action dated Nov. 5, 2015", 13 pgs.

"U.S. Appl. No. 14/314,334, Non Final Office dated Nov. 13, 2015", 39 pgs.

"U.S. Appl. No. 14/314,334, Response filed Apr. 13, 2016 to Non Final Office Action dated Nov. 13, 2015", 20 pgs.

(56) References Cited

OTHER PUBLICATIONS

"U.S. Appl. No. 14/314,343, Non Final Office Action dated Nov. 4, 2015", 14 pgs.
"U.S. Appl. No. 14/314,343, Response filed Apr. 4, 2016 to Non Final Office Action dated Nov. 4, 2015", 10 pgs.
"U.S. Appl. No. 14/325,477, Non Final Office Action dated Oct. 9, 2015", 17 pgs.
"U.S. Appl. No. 14/325,477, Notice of Allowance dated Mar. 17, 2016", 5 pgs.
"U.S. Appl. No. 14/325,477, Response filed Feb. 9, 2016 to Non Final Office Action dated Oct. 9, 2015", 13 pgs.
John, Wiley, et al., "Digital Image Processing: Principles and Applications", Baxes, (1994), 88-91.
"U.S. Appl. No. 14/314,312, Final Office Action dated May 5, 2016", 28 pgs.
"U.S. Appl. No. 14/314,334, Final Office Action dated May 16, 2016", 43 pgs.
"U.S. Appl. No. 14/314,343, Final Office Action dated May 6, 2016", 19 pgs.
"U.S. Appl. No. 14/314,312, Non Final Office Action dated Oct. 17, 2016", 33 pgs.
"U.S. Appl. No. 14/314,312, Response filed Oct. 5, 2016 to Final Office Action dated May 5, 2016", 12 pgs.
"U.S. Appl. No. 14/314,324, Response filed Oct. 5, 2016 to Final Office Action dated May 5, 2016", 14 pgs.
"U.S. Appl. No. 14/314,334, Non Final Office Action dated Dec. 1, 2016", 45 pgs.
"U.S. Appl. No. 14/314,343, Non Final Office Action dated Nov. 17, 2016", 31 pgs.
"U.S. Appl. No. 14/314,334, Response filed Oct 17, 2016 to Final Office Action dted May 16, 2016", 16 pgs.
"U.S. Appl. No. 14/314,343, Response filed Oct. 6, 2016 to Final Office Action dated May 6, 2016", 13 pgs.
"U.S. Appl. No. 15/208,973, Preliminary Amendment filed Jan. 17, 2017", 9 pgs.
Chen, et al., "Manipulating, Deforming and Animating Sampled Object Representations", Computer Graphics Forum vol. 26, (2007), 824-852 pgs.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

\* cited by examiner

FIG. 6

METHOD FOR REAL-TIME VIDEO PROCESSING INVOLVING CHANGING FEATURES OF AN OBJECT IN THE VIDEO

CROSS-REFERENCE TO RELATED APPLICATIONS

This application claims the benefit of U.S. Provisional Application No. 61/936,016, filed on Feb. 28, 2014.

BACKGROUND OF THE INVENTION

Technical Field

The disclosed embodiments relate generally to the field of real-time video processing. In particular, the disclosed embodiments relate to a computerized system and a method for real-time video processing that involves changing features of an object in a video.

Description of the Related Art

At the present time some programs can provide processing of still images. For example, U.S. Patent Application Publication No. US2007268312, incorporated herein by reference, discloses a method of replacing face elements by some components that is made by users for real-time video. However, it is not possible to process real time video in such a way that an object shown in real time video can be modified in real time naturally with some effects. In case of a human's face such effects can include making a face younger/older and etc.

Thus, new and improved systems and methods are needed that would enable real time video stream processing that involves changing features of an object in the video stream.

SUMMARY OF INVENTION

The embodiments described herein are directed to systems and methods that substantially obviate one or more of the above and other problems associated with the conventional technology for real time video stream processing. In accordance with one aspect of the embodiments described herein, there is provided a method for real-time video processing for changing features of an object in a video, the method comprises: providing an object in the video, the object being at least partially and at least occasionally presented in frames of the video; detecting the object in the video; generating a list of at least one element of the object, the list being based on the object's features to be changed according to a request for modification; detecting the at least one element of the object in the video; tracking the at least one element of the object in the video; and transforming the frames of the video such that the at least one element of the object is modified according to the request for modification.

In one or more embodiments, transforming the frames of the video comprises: calculating characteristic points for each of the at least one element of the object; generating a mesh based on the calculated characteristic points for each of the at least one element of the object; tracking the at least one element of the object in the video, wherein tracking comprises aligning the mesh for each of the at least one element with a position of the corresponding each of the at least one element from frame to frame; generating a set of first points on the mesh for each of the at least one element of the object based on the request for modification; generating a set of second points on the mesh based on the set of first points and the request for modification; and transforming the frames of the video such that the at least one element of the object is modified, wherein, for each of the at least one element of the object, the set of first points comes into the set of second points using the mesh In one or more embodiments, the computer-implemented method further comprises: generating a square grid associated with the background of the object in the video; and transforming the background of the object using the square grid in accordance with the modification of the at least one element of the object.

In one or more embodiments, the computer-implemented method further comprises: generating at least one square grid associated with regions of the object that are adjacent to the modified at least one element of the object; and modifying the regions of the object that are adjacent to the modified at least one element of the object in accordance with the modification of the at least one element of the object using the at least one square grid.

In one or more embodiments, the detecting of the object in the video is implemented with the use of Viola-Jones method.

In one or more embodiments, calculating of the object's characteristic points is implemented with the use of an Active Shape Model (ASM).

In one or more embodiments, transforming the frames of the video comprises: calculating characteristic points for each of the at least one element of the object; generating a mesh based on the calculated characteristic points for each of the at least one element of the object; generating a set of first points on the mesh for each of the at least one element of the object based on the request for modification; generating at least one area based on the set of first points for each of the at least one element of the object; tracking the at least one element of the object in the video, wherein the tracking comprises aligning the at least one area of each of the at least one element with a position of the corresponding each of the at least one element from frame to frame; transforming the frames of the video such that the properties of the at least one area are modified based on the request for modification.

In one or more embodiments, modification of the properties of the at least one area includes changing color of the at least one area.

In one or more embodiments, modification of the properties of the at least one area includes removing at least part of the at least one area from the frames of the video.

In one or more embodiments, modification of the properties of at least one area includes adding at least one new object to the at least one area, the at least one new object is based on the request for modification.

In one or more embodiments, objects to be modified include a human's face.

In one or more embodiments, the processed video comprises a video stream.

In accordance with another aspect of the embodiments described herein, there is provided a mobile computerized system comprising a central processing unit and a memory, the memory storing instructions for: providing an object in the video, the object being at least partially and at least occasionally presented in frames of the video; detecting the object in the video; generating a list of at least one element of the object, the list being based on the object's features to be changed according to a request for modification; detecting the at least one element of the object in the video; tracking the at least one element of the object in the video; and transforming the frames of the video such that the at least one element of the object is modified according to the request for modification.

In one or more embodiments, transforming the frames of the video comprises: calculating characteristic points for each of the at least one element of the object; generating a mesh based on the calculated characteristic points for each of the at least one element of the object; tracking the at least one element of the object in the video, wherein tracking comprises aligning the mesh for each of the at least one element with a position of the corresponding each of the at least one element from frame to frame; generating a set of first points on the mesh for each of the at least one element of the object based on the request for modification; generating a set of second points on the mesh based on the set of first points and the request for modification; and transforming the frames of the video such that the at least one element of the object is modified, wherein, for each of the at least one element of the object, the set of first points comes into the set of second points using the mesh.

In one or more embodiments, the computer-implemented method further comprises: generating a square grid associated with the background of the object in the video; and transforming the background of the object using the square grid in accordance with the modification of the at least one element of the object.

In one or more embodiments, the computer-implemented method further comprises: generating at least one square grid associated with regions of the object that are adjacent to the modified at least one element of the object; and modifying the regions of the object that are adjacent to the modified at least one element of the object in accordance with the modification of the at least one element of the object using the at least one square grid.

In one or more embodiments, the detecting of the object in the video is implemented with the use of Viola-Jones method.

In one or more embodiments, calculating of the object's characteristic points is implemented with the use of an Active Shape Model (ASM).

In one or more embodiments, transforming the frames of the video comprises: calculating characteristic points for each of the at least one element of the object; generating a mesh based on the calculated characteristic points for each of the at least one element of the object; generating a set of first points on the mesh for each of the at least one element of the object based on the request for modification; generating at least one area based on the set of first points for each of the at least one element of the object; tracking the at least one element of the object in the video, wherein the tracking comprises aligning the at least one area of each of the at least one element with a position of the corresponding each of the at least one element from frame to frame; transforming the frames of the video such that the properties of the at least one area are modified based on the request for modification.

In one or more embodiments, modification of the properties of the at least one area includes changing color of the at least one area.

In one or more embodiments, modification of the properties of the at least one area includes removing at least part of the at least one area from the frames of the video.

In one or more embodiments, modification of the properties of at least one area includes adding at least one new object to the at least one area, the at least one new object is based on the request for modification.

In one or more embodiments, objects to be modified include a human's face.

BRIEF DESCRIPTION OF DRAWINGS

The accompanying drawings, which are incorporated in and constitute a part of this specification exemplify the embodiments of the present invention and, together with the description, serve to explain and illustrate principles of the inventive technique. Specifically:

FIG. 4($a$) and FIG. 4($b$) show an example of a mean face (a) and an example of a current observation.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

It will be appreciated that the method for real time video processing can be performed with any kind of video data, e.g. video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data.

The embodiments disclosed further are aimed for processing of video streams, however all other types of video data including video files saved in a memory of a computerized system can be processed by the methods of the present invention. For example, a user can load video files and save them in a memory of his computerized system and such video files can be also processed by the methods of the present invention. In accordance with one aspect of the embodiments described herein, there is provided a computerized system and a computer-implemented method for processing a real-time video stream that involves changing features of an object in the video stream. The described method may be implemented using any kind of computing device including desktops, laptops, tablet computers, mobile phones, music players, multimedia players etc. having any kind of generally used operational system such as Windows®, iOS®, Android® and others. All disclosed embodiments and examples are non-limiting to the invention and disclosed for illustrative purposes only.

It is important to note that any objects can be processed by the embodiments of the described method, including, without limitation, such objects as a human's face and parts of a human body, animals, and other living creatures or non-living things which images can be transported in a real-time video stream.

Figure 1:
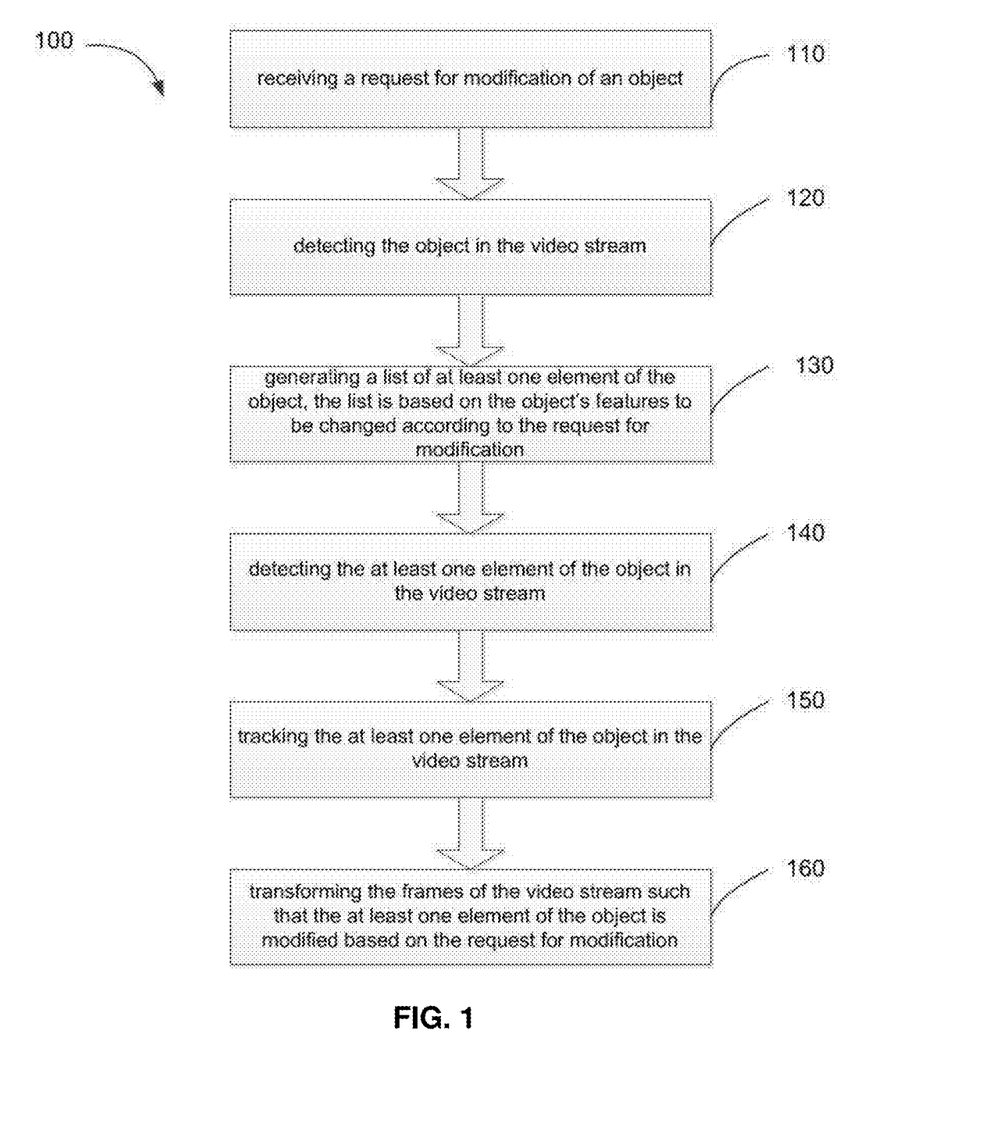
FIG. 1 illustrates a method for real-time video processing for changing features of an object in a video according to the first embodiment of the invention.

The method 100 according to the first embodiment of the invention is illustrated in FIG. 1. The method 100 is preferably used for an object in a video stream that at least partially and at least occasionally presented in frames of the video stream. In other words, the method 100 is applicable for those objects that are not presented in frames of a video stream all the time. According to the method 100 a request for modification of the object including changing its features is received (stage 110). The mentioned request can be issued by a user having a relation to a video stream, a system enabling a process of the video stream, or by any other source.

Next, the object from the request for modification is detected in the video stream (stage 120), for example 5 with the use of the conventional Viola-Jones method, and the request for modification is analyzed by generating a list having one or more elements of the object (stage 130) such that the mentioned list is based on the object's features that must be changed according to the request.

Further, in one or more embodiments, the elements of the object are detected (stage 140) and tracked (stage 150) in the video stream.

Finally, in one or more embodiments, the elements of the object are modified according to the request for modification, thus transforming the frames of the video stream (stage 160).

It shall be noted that transformation of frames of a video stream can be performed by different methods for different kinds of transformation. For example, for transformations of frames mostly referring to changing forms of object's elements the second embodiment of the invention can be used. According to the second embodiment, primarily characteristic points for each of element of an object are calculated. Hereinafter characteristic points refer to points of an object which relate to its elements used in changing features of this object. It is possible to calculate characteristic points with the use of an Active Shape Model (ASM) or other known methods. Then, a mesh based on the characteristic points is generated for each of the at least one element of the object. This mesh used in the following stage of tracking the elements of the object in the video stream. In particular in the process of tracking the mentioned mesh for each element is aligned with a position of each element. Further, two sets additional points are generated on the mesh, namely a set of first points and a set of second points. The set of first points is generated for each element based on a request for modification, and the set of second points is generated for each element based on the set of first points and the request for modification. Then, the frames of the video stream can be transformed by modifying the elements of the object on the basis of the sets of first and second points and the mesh.

In such method a background of the modified object can be changed or distorted. Thus, to prevent such effect it is possible to generate a square grid associated with the background of the object and to transform the background of the object based on modifications of elements of the object using the square grid.

As it can be understood by those skilled in the art, not only the background of the object but also some its regions adjacent to the modified elements can be changed or distorted. Here, one or several square grids associated with the mentioned regions of the object can be generated, and the regions can be modified in accordance with the modification of elements of the object by using the generated square grid or several square grids.

In one or more embodiments, transformations of frames referring to changing some areas of an object using its elements can be performed by the third embodiment of the invention that is similar to the third embodiment. More specifically, transformation of frames according to the third embodiment begins with calculating of characteristic points for each element of an object and generating a mesh based on the calculated characteristic points. After that a set of first points is generated on the mesh for each element of the object on the basis of a request for modification. Then one or more areas based on the set of first points are generated for each element. Finally, the elements of the object are tracked by aligning the area for each element with a position for each of the at least one element, and properties of the areas can be modified based on the request for modification, thus transforming the frames of the video stream.

According to the nature of the request for modification properties of the mentioned areas can be transformed in different ways:
changing color of areas;
removing at least some part of areas from the frames of the video stream;
including one or more new objects into areas which are based on a request for modification.

It should be noted that different areas or different parts of such areas can be modified in different ways as mentioned above, and properties of the mentioned areas can be also modified in a different manner other then the specific exemplary modifications described above and apparent for those skilled in the art.

Face detection and face tracking are discussed below in greater detail.

Face Detection and Initialization

In one or more embodiments, first, in the algorithm for changing proportion a user sends a request for changing proportions of an object in a video stream. The next step in the algorithm involves detecting the object in the video stream.

In one or more embodiments, the face is detected on an image with use of Viola-Jones method. Viola-Jones method is a fast and quite accurate method used to detect the face region. Then, an Active Shape Model (ASM) algorithm is applied to the face region of an image to detect facial feature reference points. However, it should be appreciated that other methods and algorithms suitable for face detection can be used.

Figure 2:
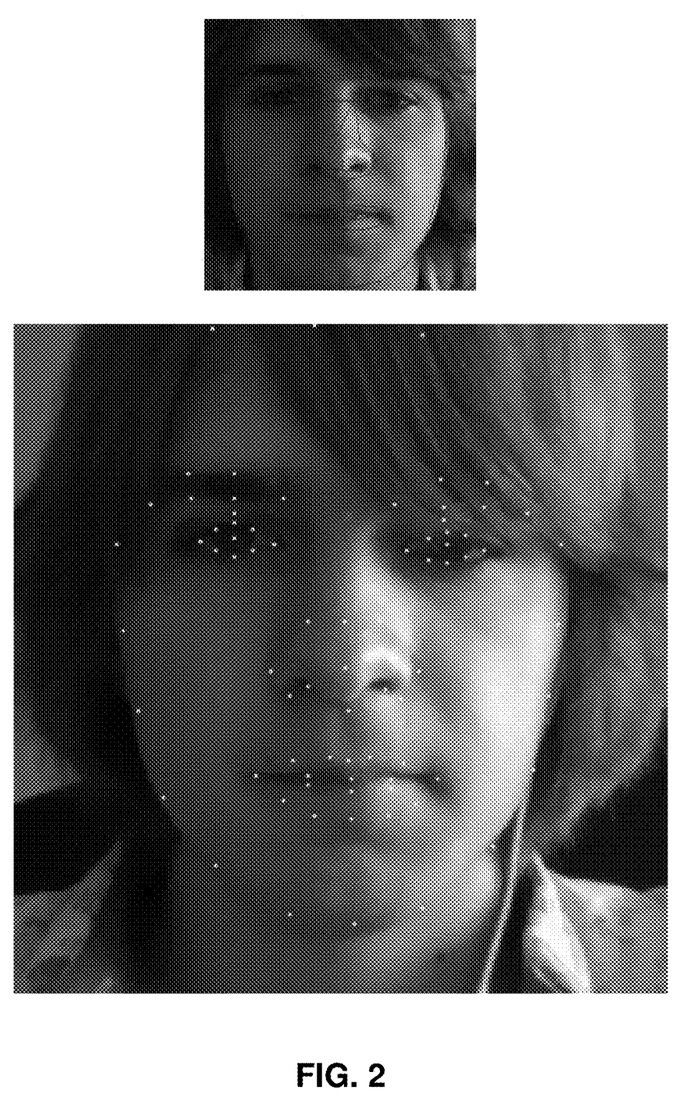
FIG. 2 illustrates facial feature reference points detected by an ASM algorithm used in the method according to one embodiment of the present invention.

In one or more embodiments, for locating facial features locating of landmarks is used. A landmark represents a distinguishable point present in most of the images under consideration, for example, the location of the left eye pupil (FIG. 2).

In one or more embodiments, a set of landmarks forms a shape. Shapes are represented as vectors: all the x- followed by all the y-coordinates of the points in the shape. One shape is aligned to another with a similarity transform (allowing translation, scaling, and rotation) that minimizes the average Euclidean distance between shape points. The mean shape is the mean of the aligned training shapes (which in the present disclosure are manually landmarked faces).

In one or more embodiments, subsequently, in accordance with the ASM algorithm, the search for landmarks from the mean shape aligned to the position and size of the face determined by a global face detector is started. It then repeats the following two steps until convergence (i) suggest a tentative shape by adjusting the locations of shape points by template matching of the image texture around each point (ii) conform the tentative shape to a global shape model. The individual template matches are unreliable and the shape model pools the results of the weak template matchers to form a stronger overall classifier. The entire search is repeated at each level in an image pyramid, from coarse to fine resolution. It follows that two types of sub-model make up the ASM: the profile model and the shape model.

In one or more embodiments, the profile models (one for each landmark at each pyramid level) are used to locate the approximate position of each landmark by template matching. Any template matcher can be used, but the classical ASM forms a fixed-length normalized gradient vector (called the profile) by sampling the image along a line (called the whisker) orthogonal to the shape boundary at the landmark. During training on manually landmarked faces, at each landmark the mean profile vector g and the profile covariance matrix Sg are calculated. During searching, the landmark along the whisker to the pixel whose profile g has lowest Mahalanobis distance from the mean profile g is displaced, where the $$\text{MahalanobisDistance} = (g-\underline{g})^T S_g^{-1}(g-\underline{g}) \text{ Mahalanobis-Distance} = (g-\underline{g})^T S_g^{-1}(g-\underline{g}). \quad (1)$$

The shape model specifies allowable constellations of landmarks. It generates a shape $\hat{x}$ with $$\hat{x} = \underline{x} + \_b \quad (2)$$

where $\hat{x}$ is the mean shape, is a parameter vector, and __ is a matrix of selected eigenvectors of the covariance matrix Sg of the points of the aligned training shapes. Using a standard principal components approach, model has as much variation in the training set as it is desired by ordering the eigenvalues λi of Ss and keeping an appropriate number of the corresponding eigenvectors in φ. In the method, a single shape model for the entire ASM is used but it is scaled for each pyramid level.

Then the Equation 2 is used to generate various shapes by varying the vector parameter b. By keeping the elements of b within limits (determined during model building) it is possible to ensure that generated face shapes are lifelike.

Conversely, given a suggested shape x, it is possible to calculate the parameter b that allows Equation 2 to best approximate x with a model shape x̂. An iterative algorithm, described by Cootes and Taylor, that gives the b and T that minimizes $$\text{distance}(x, T(\underline{x}+\_b)) \quad (3)$$

where T is a similarity transform that maps the model space into the image space is used.

In one or more embodiments, mapping can be built from facial feature reference points, detected by ASM, to Candide-3 point, and that gives us Candide-3 points x and y coordinates. Candide is a parameterised face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\sum_{i=1}^{m} \Box X_{ij} \cdot B_j = x_i. \quad (4)$$

$$\sum_{i=1}^{m} \Box Y_{ij} \cdot B_j = y_i. \quad (5)$$

where—j-th shape unit, xi, yi—i-th point coordinates, Xij, Yij—coefficients, which denote how the i-th point coordinates are changed by j-th shape unit. In this case, this system is overdetermined, so it can be solved precisely. Thus, the following minimization is made:

$$\left(\sum_{i=1}^{m} \Box X_{ij} \cdot B_j = x_i\right)^2 + \left(\sum_{i=1}^{m} \Box Y_{ij} \cdot B_j = y_i\right)^2 - \quad (6)$$

$$\min\left(\sum_{i=1}^{m} \Box X_{ij} \cdot B_j = x_i\right)^2 + \left(\sum_{i=1}^{m} \Box Y_{ij} \cdot B_j = y_i\right)^2 - \min\Box.$$

Let's denote $X=((X_{ij})^T,(Y_{ij})^T)^T$, $x=((x_i)^T,(y_i)^T)^T$, $B=(B_j)^T$. $\quad (7)$ This equation system is linear, so it's solution is $$B=(X^TX)^{-1}X^Tx \quad (8)$$

In one or more embodiments, it is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 3:
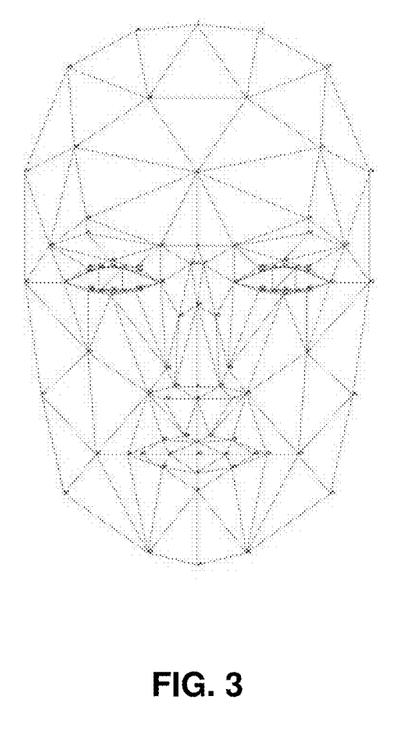
FIG. 3 illustrates Candide-3 model used in the method according to one embodiment of the present invention.

In one or more embodiments, the next step comprises tracking the detected object in the video stream. In the present invention the abovementioned Candide-3 model is used (see Ahlberg, J.: Candide-3, an updated parameterized face. Technical report, Linköping University, Sweden (2001)), incorporated herein by reference, for tracking face in a video stream). The mesh or mask corresponding to Candide-3 model is shown in FIG. 3.

In one or more embodiments, a state of the model can be described by shape units intensity vector, action units intensity vector and a position-vector. Shape units are some main parameters of a head and a face. In the present invention next 10 units are used:

Eyebrows vertical position
Eyes vertical position
Eyes width
Eyes height
Eye separation distance
Nose vertical position
Nose pointing up
Mouth vertical position
Mouth width
Chin width In one or more embodiments, action units are face parameters that correspond to some face movement. In the present invention next 7 units are used:

Upper lip raiser
Jaw drop
Lip stretcher
Left brow lowerer
Right brow lowerer

Lip corner depressor

Outer brow raiser

Figure 4A:
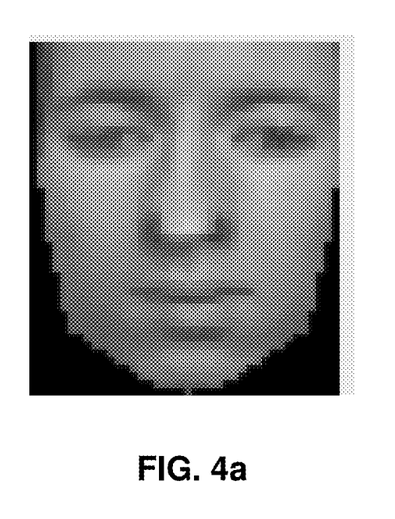
Figure 4B:
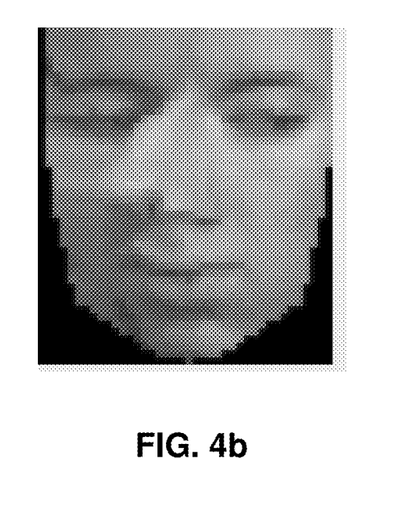
Figure 5:
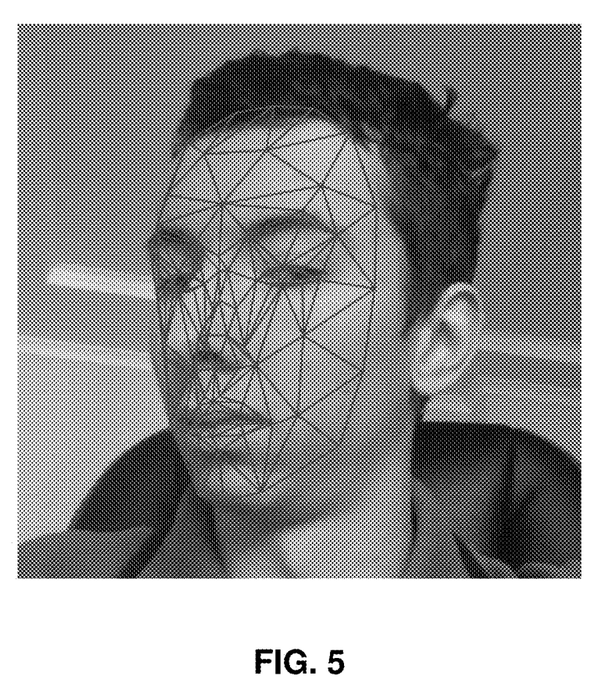
FIG. 5 illustrates Candide at a frame used in the method according to one embodiment of the present invention.

In one or more embodiments, the mask position at a picture can be described by using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16(9):1107-1124 (2006), incorporated herein by reference) is to find the mask position, which observes the region most likely to be a face. For each position it is possible to calculate the observation error—the value that indicates the difference between image under current mask position and the mean face. An example of the mean face and of the observation under current position is illustrated in FIGS. 4(*a*)-3(*b*). FIG. 4(*b*) corresponds to the observation under the mask shown in FIG. 5.

In one or more embodiments, human face is modeled as a picture with a fixed size (width=40 px, height=46 px) called a mean face. Gaussian distribution that is proposed in the original algorithms has shown worse result in comparison with the static image. So, a difference between the current observation and the mean face is calculated in the following way:

$$e(b) = \Sigma(\log(1+I_m) - \log(1+I_j))^2 \quad (9)$$

Logarithm function makes tracking more stable.

In one or more embodiments, to minimize error, Taylor series is used as it was proposed by Dornaika at. el. (see Dornaika, F., Davoine, F.: On appearance based face and facial action tracking. IEEE Trans. Circuits Syst. Video Technol. 16(9):1107-1124 (2006)). It was found that it is not necessary to sum up a number of finite difference when calculating an approximation to first derivative. Derivative is calculated in the following way:

$$g_{ij} = \frac{W(y_t, b_t + \_b_t)_{ij} - W(y_t, b_t - \_b_t)_{ij}}{-j} \quad (10)$$

Here $g_{ij}$ is an element of matrix G. This matrix has size m*n, where m is large enough (about 1600) and n is small (about 14). In case of straight-forward calculating there have to be done n*m operations of division. To reduce the number of divisions this matrix can be rewritten as a product of two matrices:

$$G = A*B$$

Where matrix A has the same size as G and its element is:

$$a_{ij} = W(y_t, b_t + \_b_t)_{ij} - W(y_t, b_t - \_b_t)_{ij} \quad (11)$$

and matrix B is a diagonal matrix with sizes n*n, and $b_{ij} = \_i^{-1}$

Now Matrix $G_t^+$ has to be obtained and here is a place where a number of divisions can be reduced.

$$G_t^+ = (G^T G)^{-1} G^T = (B^T A^T A B)^{-1} B^T A^T = B^{-1}(A^T A)^{-1} B^{-1} B A^T = B^{-1}(A^T A)^{-1} A^T \quad (12)$$

After that transformation this can be done with n*n divisions instead of m*n.

One more optimization was used here. If matrix is created and then multiplied to $\_b_t$, it leads to $n^2 m$ operations, but if first $A^T$ and $\_b_t$ are multiplied and then $B^{-1}(A^T A)^{-1}$ with it, there will be only $n*m + n^3$ operations, that is much better because n<<m.

Thus, the step of tracking the detected object in the video stream in the present embodiment comprises creating a mesh that is based on the detected feature reference points of the object and aligning the mesh to the object on each frame.

It should be also noted that to increase tracking speed in the present invention multiplication of matrices is performed in such a way that it can be boosted using ARM advanced SIMD extensions (also known as NEON). Also, the GPU is used instead of CPU whenever possible. To get high performance of the GPU, operations in the present invention are grouped in a special way.

Thus, tracking according to the exemplary embodiment of the invention has the following advantageous features:

1. Before tracking, Logarithm is applied to the grayscale value of each pixel to track it. This transformation has a great impact to tracking performance.

2. In the procedure of gradient matrix creation, the step of each parameter depends on the scale of the mask.

Exemplary Computer Platform

Figure 6:
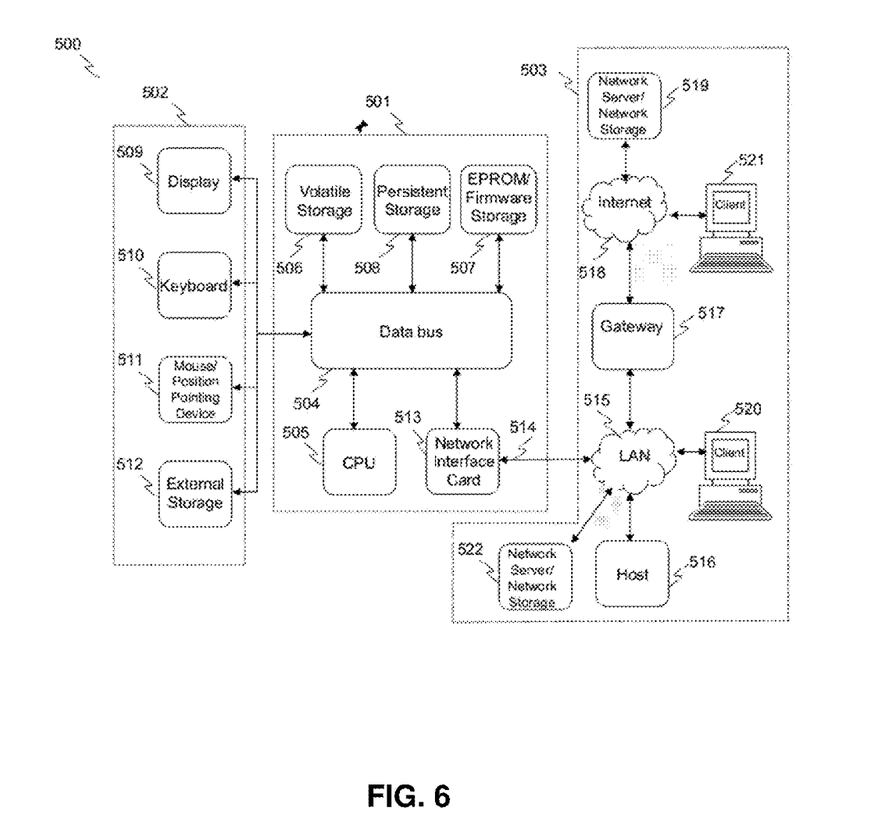
FIG. 6 illustrates an exemplary embodiment of a computer platform based on which the techniques described herein may be implemented.

FIG. 6 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522. Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, pert, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video stream processing. It is intended that the specification and examples be considered as exemplary only, with a true scope and spirit of the invention being indicated by the following claims.

What is claimed is:

1. A computer-implemented method for real-time video processing for changing features of an object in a video, the method being performed in connection with a computerized system comprising a processing unit and a memory, the method comprising:
   providing the object in the video, the object being at least partially and at least occasionally presented in frames of the video;
   detecting the object in the video;
   generating a list of at least one element of the object, the list being based on the object's features to be changed according to a request for modification;
   detecting the at least one element of the object in the video;
   tracking the at least one element of the object in the video;
   transforming the frames of the video to generate modified frames such that the at least one element of the object is modified within the video in which the object is detected while the video is provided at a computing device and the object is detected in the video, the frames transformed according to the request for modification resulting in at least one modified element, the at least one modified element being a version of the at least one elements detected and tracked within the video; and
   providing the modified frames including the at least one modified element within the video.

2. The computer-implemented method of claim 1, wherein transforming the frames of the video comprises:
   calculating characteristic points for each of the at least one element of the object;
   generating a mesh based on the calculated characteristic points for each of the at least one element of the object;
   tracking the at least one element of the object in the video, wherein tracking comprises aligning the mesh for each of the at least one element with a position of the corresponding each of the at least one element from frame to frame;
   generating a set of first points on the mesh for each of the at least one element of the object based on the request for modification;
   generating a set of second points on the mesh based on the set of first points and the request for modification; and
   transforming the frames of the video such that the at least one element of the object is modified, wherein, for each of the at least one element of the object, the set of first points comes into the set of second points using the mesh.

3. The computer-implemented method of claim 2, further comprising:
   generating a square grid associated with the background of the object in the video; and
   transforming the background of the object using the square grid in accordance with the modification of the at least one element of the object.

4. The computer-implemented method of claim 2, further comprising:
   generating at least one square grid associated with regions of the object that are adjacent to the modified at least one element of the object; and
   modifying the regions of the object that are adjacent to the modified at least one element of the object in accordance with the modification of the at least one element of the object using the at least one square grid.

5. The computer-implemented method of claim 1, wherein the detecting of the object in the video is implemented with the use of Viola-Jones method.

6. The computer-implemented method of claim 2, wherein calculating of the object's characteristic points is implemented with the use of an Active Shape Model (ASM).

7. The computer-implemented method of claim 1, wherein transforming the frames of the video comprises:
   calculating characteristic points for each of the at least one element of the object;
   generating a mesh based on the calculated characteristic points for each of the at least one element of the object;
   generating a set of first points on the mesh for each of the at least one element of the object based on the request for modification;
   generating at least one area based on the set of first points for each of the at least one element of the object;
   tracking the at least one element of the object in the video, wherein the tracking comprises aligning the at least one area of each of the at least one element with a position of the corresponding each of the at least one element from frame to frame; and
   transforming the frames of the video such that the properties of the at least one area are modified based on the request for modification.

8. The computer-implemented method of claim 7, wherein modification of the properties of the at least one area includes changing color of the at least one area.

9. The computer-implemented method of claim 7, wherein modification of the properties of the at least one area includes removing at least part of the at least one area from the frames of the video.

10. The computer-implemented method of claim 7, wherein modification of the properties of at least one area includes adding at least one new object to the at least one area, the at least one new object being based on the request for modification.

11. The computer-implemented method of claim 1, wherein objects to be modified include a human's face.

12. The computer implemented method of claim 1, wherein the processed video comprises a video stream.

13. A mobile computerized system comprising a processing unit and a memory, the memory storing instructions for:
   providing an object in the video, the object being at least partially and at least occasionally presented in frames of the video;
   detecting the object in the video;
   generating a list of at least one element of the object, the list being based on the object's features to be changed according to a request for modification;
   detecting the at least one element of the object in the video;
   tracking the at least one element of the object in the video;
   transforming the frames of the video to generate modified frames such that the at least one element of the object is modified within the video in which the object is detected while the video is provided at a computing device and the object is detected in the video, the frames transformed according to the request for modification resulting in at least one modified element, the at least one modified element being a version of the at least one elements detected and tracked within the video; and providing the modified frames including the at least one modified element within the video.

14. The mobile computerized system of claim 13, wherein transforming the frames of the video comprises:
  calculating characteristic points for each of the at least one element of the object;
  generating a mesh based on the calculated characteristic points for each of the at least one element of the object;
  tracking the at least one element of the object in the video, wherein tracking comprises aligning the mesh for each of the at least one element with a position of the corresponding each of the at least one element from frame to frame;
  generating a set of first points on the mesh for each of the at least one element of the object based on the request for modification;
  generating a set of second points on the mesh based on the set of first points and the request for modification; and
  transforming the frames of the video such that the at least one element of the object is modified, wherein, for each of the at least one element of the object, the set of first points comes into the set of second points using the mesh.

15. The mobile computerized system of claim 14, further comprising:
  generating a square grid associated with the background of the object in the video; and
  transforming the background of the object using the square grid in accordance with the modification of the at least one element of the object.

16. The mobile computerized system of claim 14, further comprising:
  generating at least one square grid associated with regions of the object that are adjacent to the modified at least one element of the object; and
  modifying the regions of the object that are adjacent to the modified at least one element of the object in accordance with the modification of the at least one element of the object using the at least one square grid.

17. The mobile computerized system of claim 14, wherein calculating of the object's characteristic points is implemented with the use of an Active Shape Model (ASM).

18. The mobile computerized system of claim 13, wherein the detecting of the object in the video is implemented with the use of Viola-Jones method.

19. The mobile computerized system of claim 13, wherein transforming the frames of the video comprises:
  calculating characteristic points for each of the at least one element of the object;
  generating a mesh based on the calculated characteristic points for each of the at least one element of the object;
  generating a set of first points on the mesh for each of the at least one element of the object based on the request for modification;
  generating at least one area based on the set of first points for each of the at least one element of the object;
  tracking the at least one element of the object in the video, wherein the tracking comprises aligning the at least one area of each of the at least one element with a position of the corresponding each of the at least one element from frame to frame; and
  transforming the frames of the video such that the properties of the at least one area are modified based on the request for modification.

20. The mobile computerized system of claim 19, wherein modification of the properties of the at least one area includes changing color of the at least one area.

21. The mobile computerized system of claim 19, wherein modification of the properties of the at least one area includes removing at least part of the at least one area from the frames of the video.

22. The mobile computerized system of claim 19, wherein modification of the properties of at least one area includes adding at least one new object to the at least one area, the at least one new object is based on the request for modification.

23. The mobile computerized system of claim 13, wherein objects to be modified include a human's face.

* * * * *

UNITED STATES PATENT AND TRADEMARK OFFICE
CERTIFICATE OF CORRECTION

PATENT NO. : 9,928,874 B2
APPLICATION NO. : 14/314324
DATED : March 27, 2018
INVENTOR(S) : Elena Shaburova Page 1 of 1

It is certified that error appears in the above-identified patent and that said Letters Patent is hereby corrected as shown below:

On the Title Page

On page 3, in Column 2, item (56), under "Other Publications", Line 10, delete "dted" and insert --dated-- therefor In the Claims In Column 14, Lines 5-7, in Claim 5, delete "5. The computer-implemented method of claim 1, wherein the detecting of the object in the video is implemented with the use of Viola-Jones method." and insert --5. The computer-implemented method of claim 2, wherein calculating of the object's characteristic points is implemented with the use of an Active Shape Model (ASM).-- therefor In Column 14, Lines 8-10, in Claim 6, delete "6. The computer-implemented method of claim 2, wherein calculating of the object's characteristic points is implemented with the use of an Active Shape Model (ASM)." and insert --6. The computer-implemented method of claim 1, wherein the detecting of the object in the video is implemented with the use of Viola-Jones method.-- therefor Signed and Sealed this
Fifth Day of May, 2020

Andrei Iancu
*Director of the United States Patent and Trademark Office*